US005511648A

United States Patent [19]
Kaminski et al.

[11] Patent Number: 5,511,648
[45] Date of Patent: Apr. 30, 1996

[54] METHOD AND APPARATUS FOR TRIMMING AND INSPECTING PLASTIC CONTAINERS

[75] Inventors: Ronald S. Kaminski, Bowling Green, Ohio; Noel B. Eggert, Temperance, Mich.

[73] Assignee: Owens-Illinois Plastic Products Inc., Toledo, Ohio

[21] Appl. No.: 229,072

[22] Filed: Apr. 18, 1994

Related U.S. Application Data

[63] Continuation of Ser. No. 6,392, Jan. 21, 1993, abandoned.

[51] Int. Cl.⁶ .................................................. B65G 47/24
[52] U.S. Cl. .......................... 198/379; 198/345.1; 83/54; 83/418; 83/914; 29/564.7; 73/865.9; 408/89; 425/527; 425/534
[58] Field of Search .................. 83/54, 409.1, 410.7, 83/412, 418, 914; 198/345.1, 375, 379; 29/563, 564.7; 264/161, 536; 425/527, 534, 806; 73/865.8, 865.9; 408/70, 71, 89; 414/783

[56] References Cited

U.S. PATENT DOCUMENTS

| 3,540,371 | 11/1970 | Rudolph et al. | 83/914 X |
| 3,791,245 | 2/1974 | Eggert | 83/914 X |
| 4,421,472 | 12/1983 | Martin, Jr. | 425/527 |
| 4,614,018 | 9/1986 | Krall . | |
| 4,876,930 | 10/1989 | Thatcher | 83/914 X |
| 5,121,587 | 6/1992 | Zanini | 53/306 X |
| 5,167,316 | 12/1992 | Kaminski | 198/463.4 |

Primary Examiner—Eugenia Jones

[57] ABSTRACT

A method and apparatus for trimming and inspecting hollow plastic containers having a neck which has an opening that forms an angle with the vertical axis of the hollow container wherein as the hollow container is moved by a conveyor intermittently past a succession of stations of a trimming and inspection apparatus, the neck of the container is clamped and oriented so that the axis of the opening is vertical and the trimming or inspecting tooling is moved downwardly to engage and perform the trimming or inspecting. In one form two containers are simultaneously clamped and oriented.

11 Claims, 14 Drawing Sheets

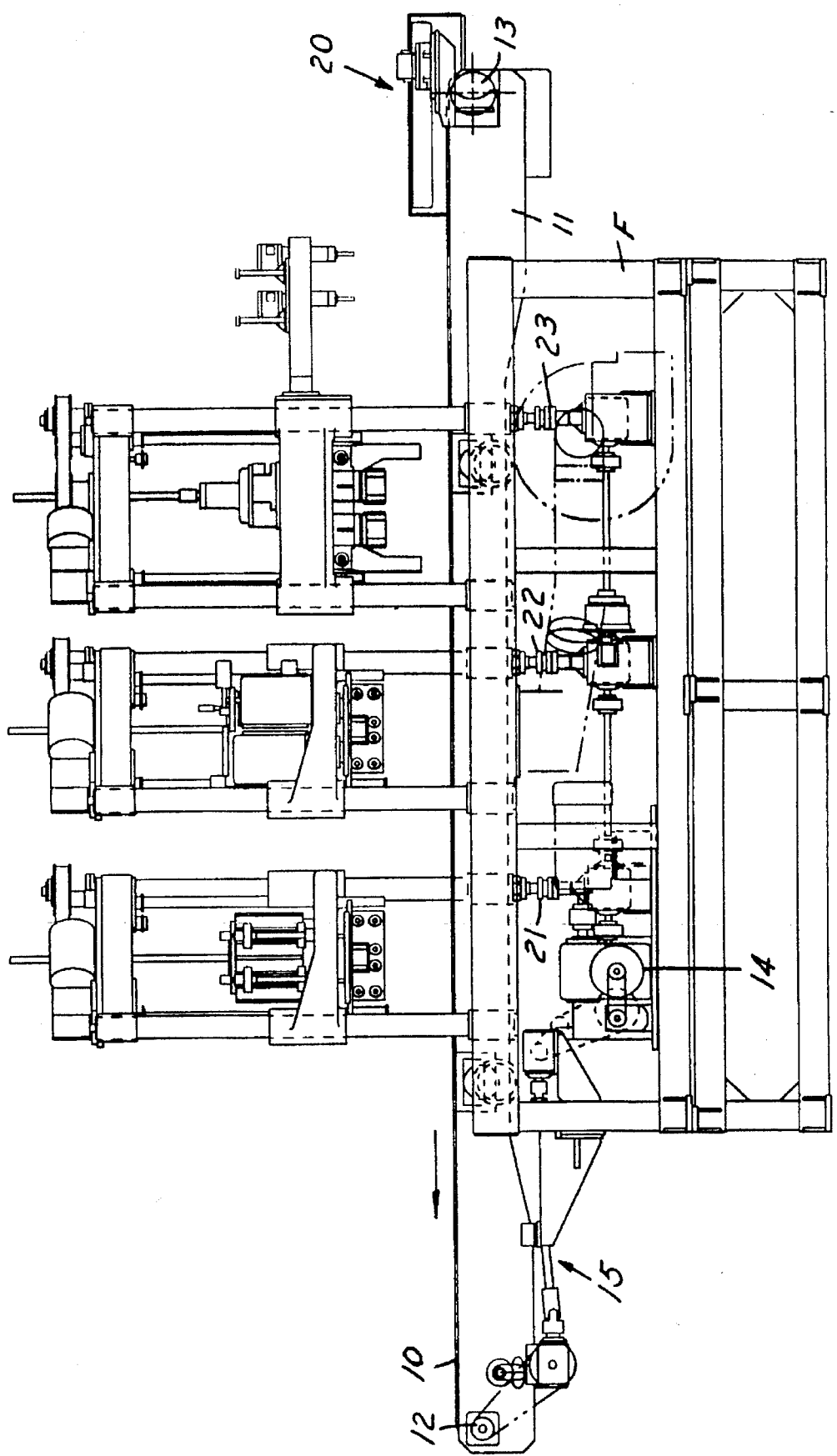

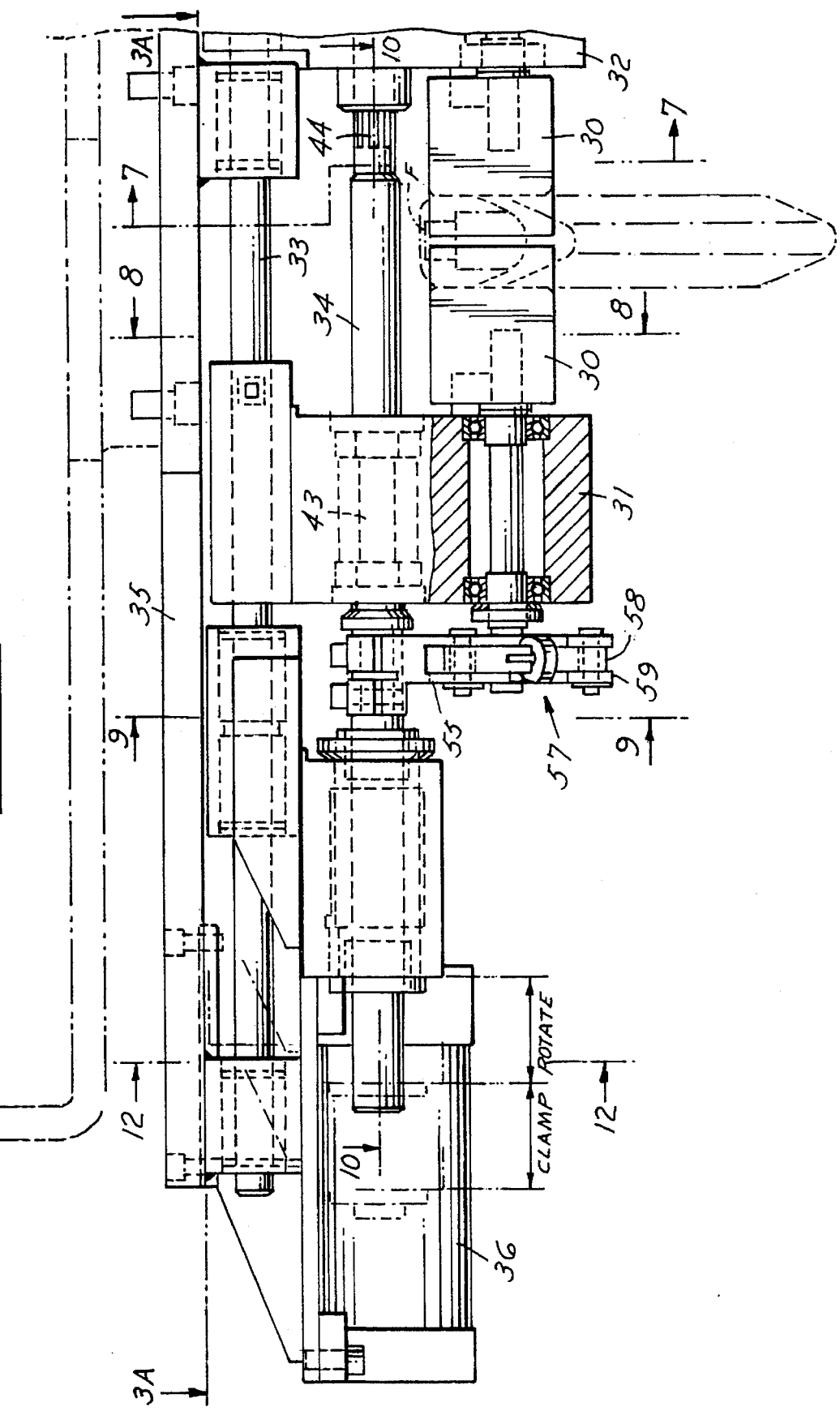

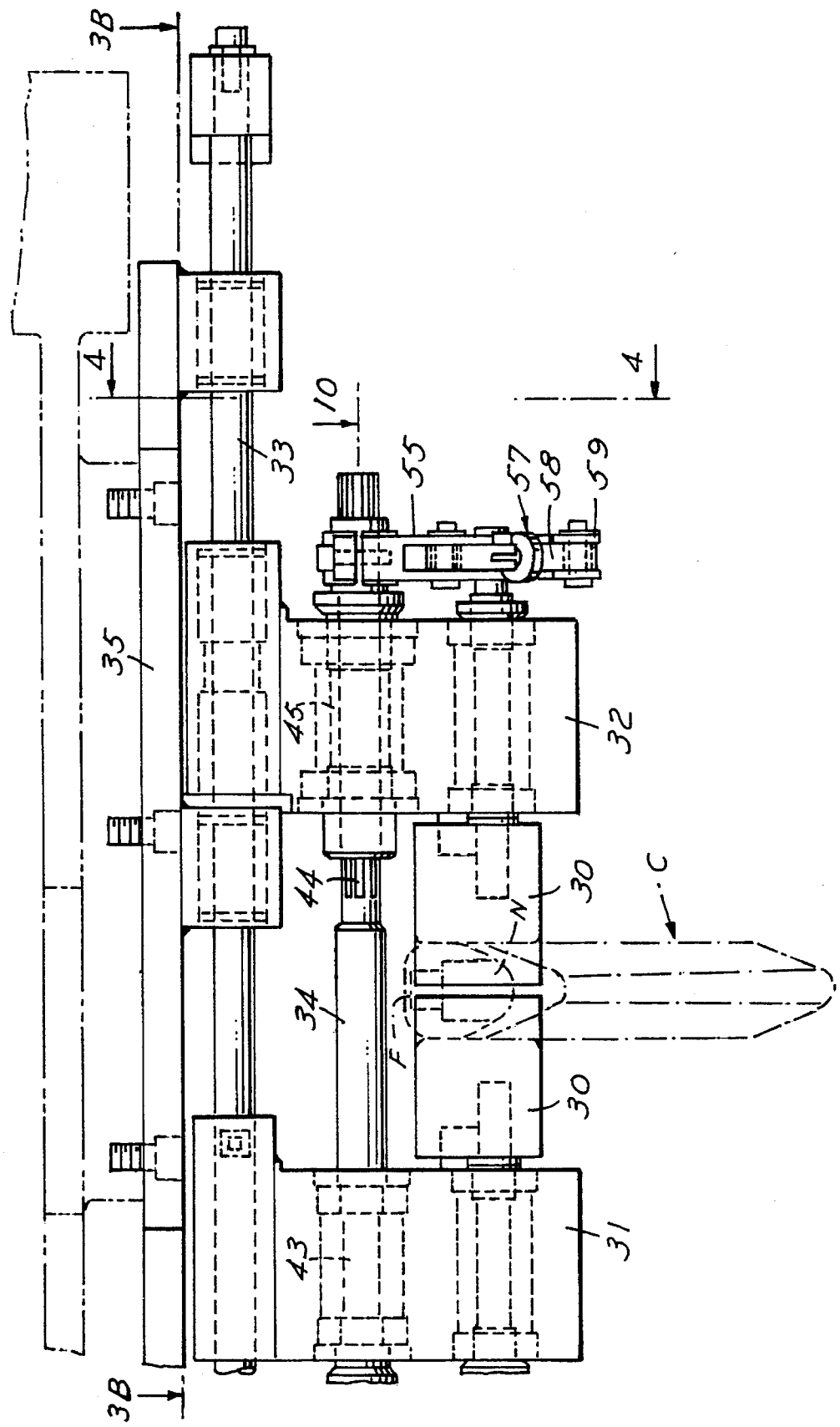

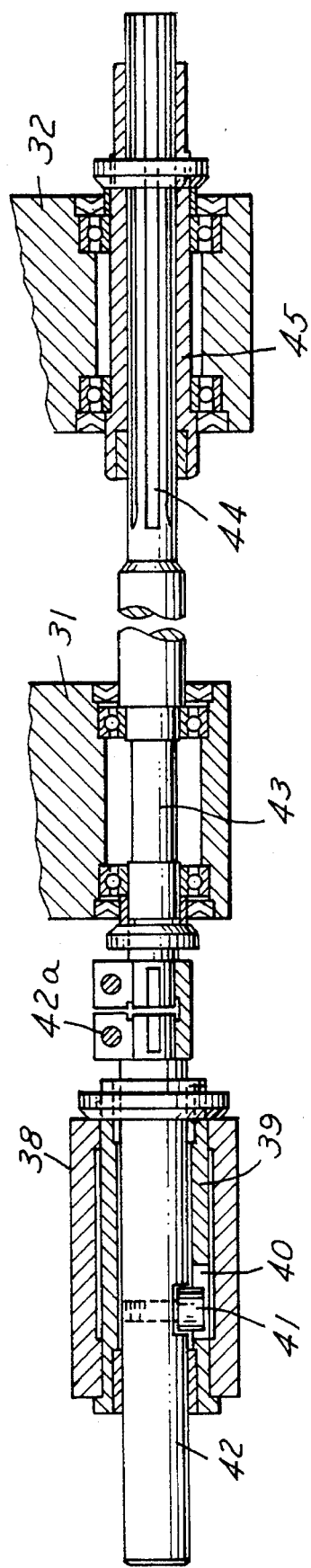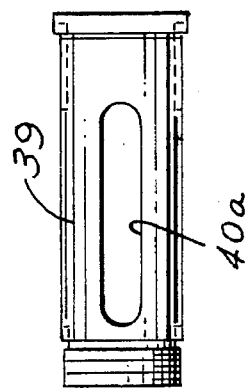

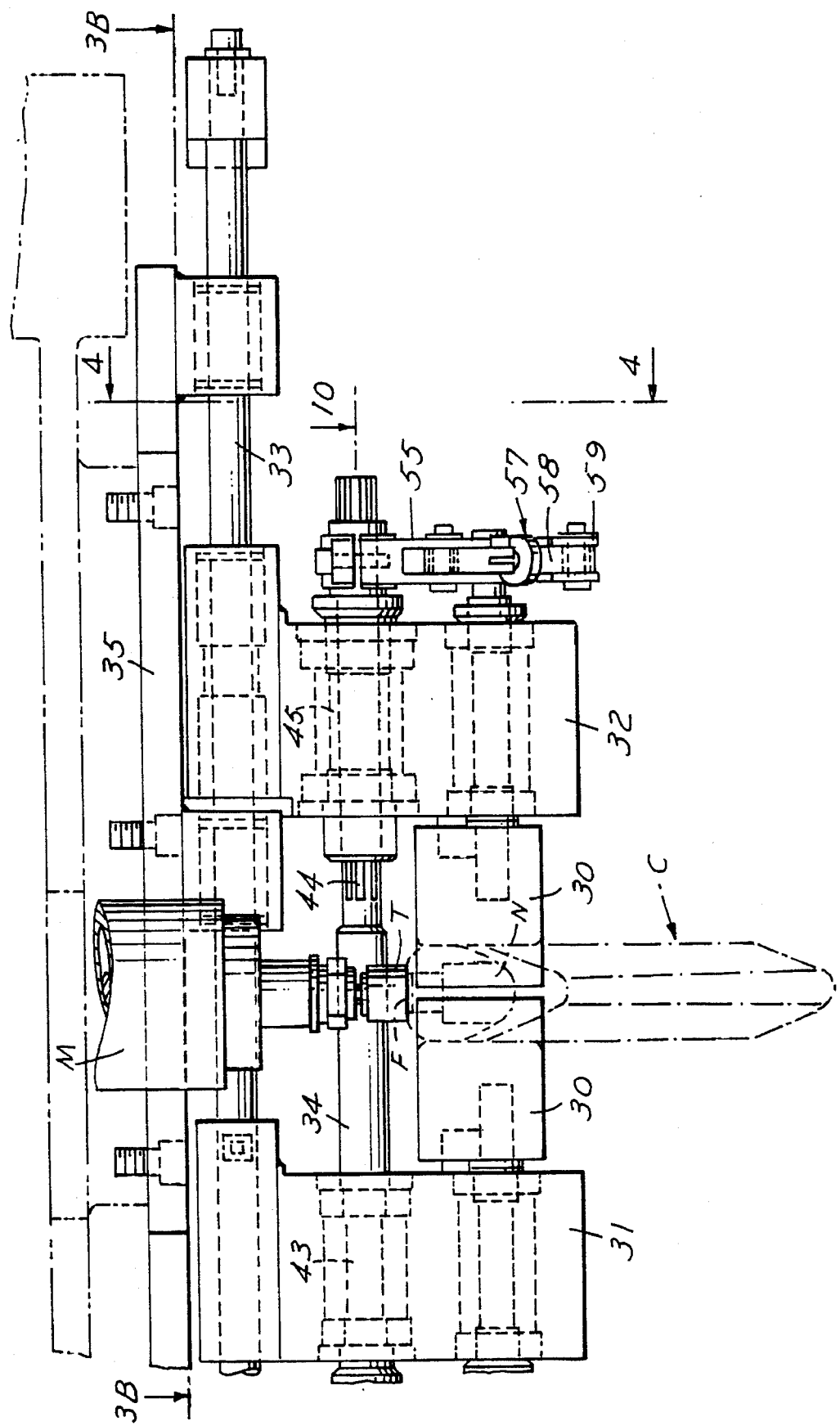

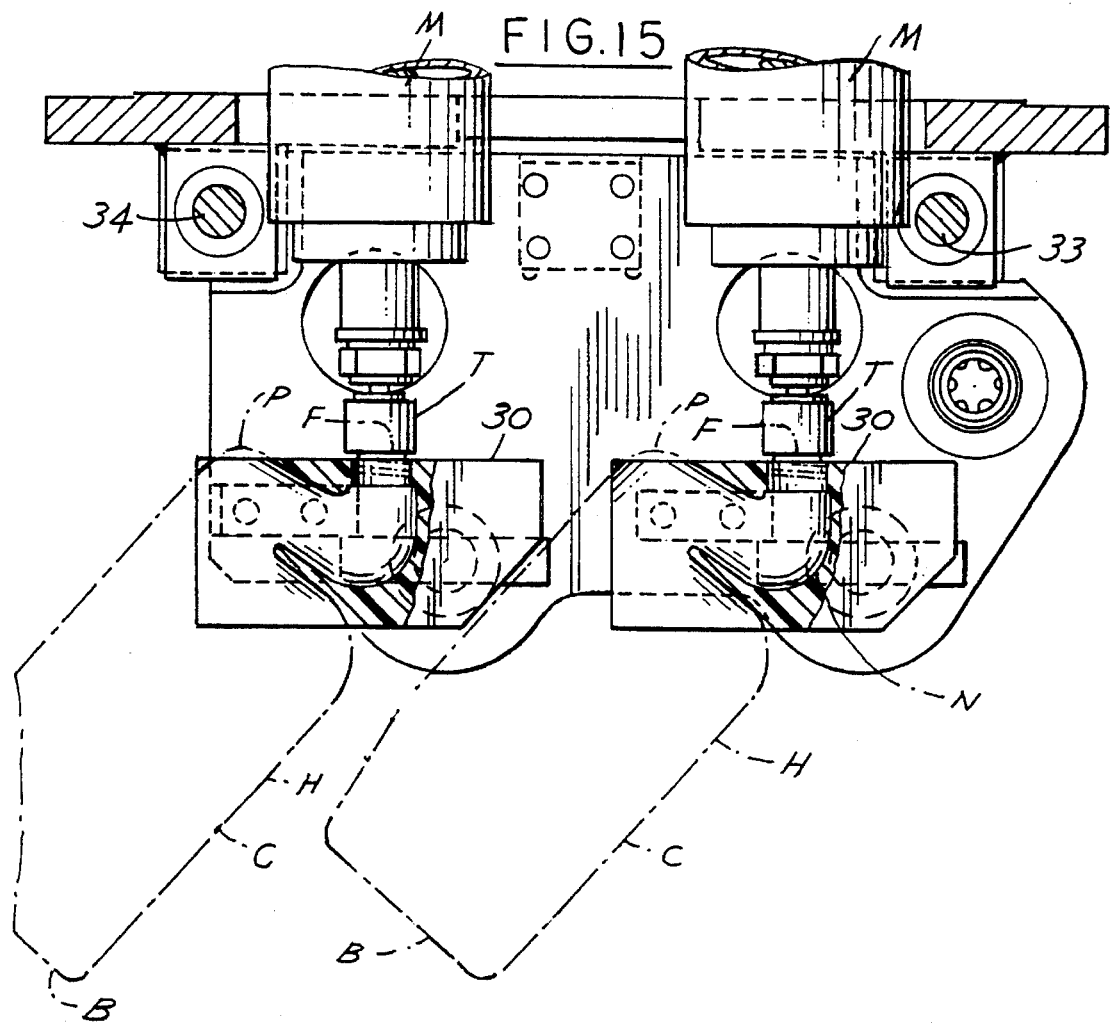

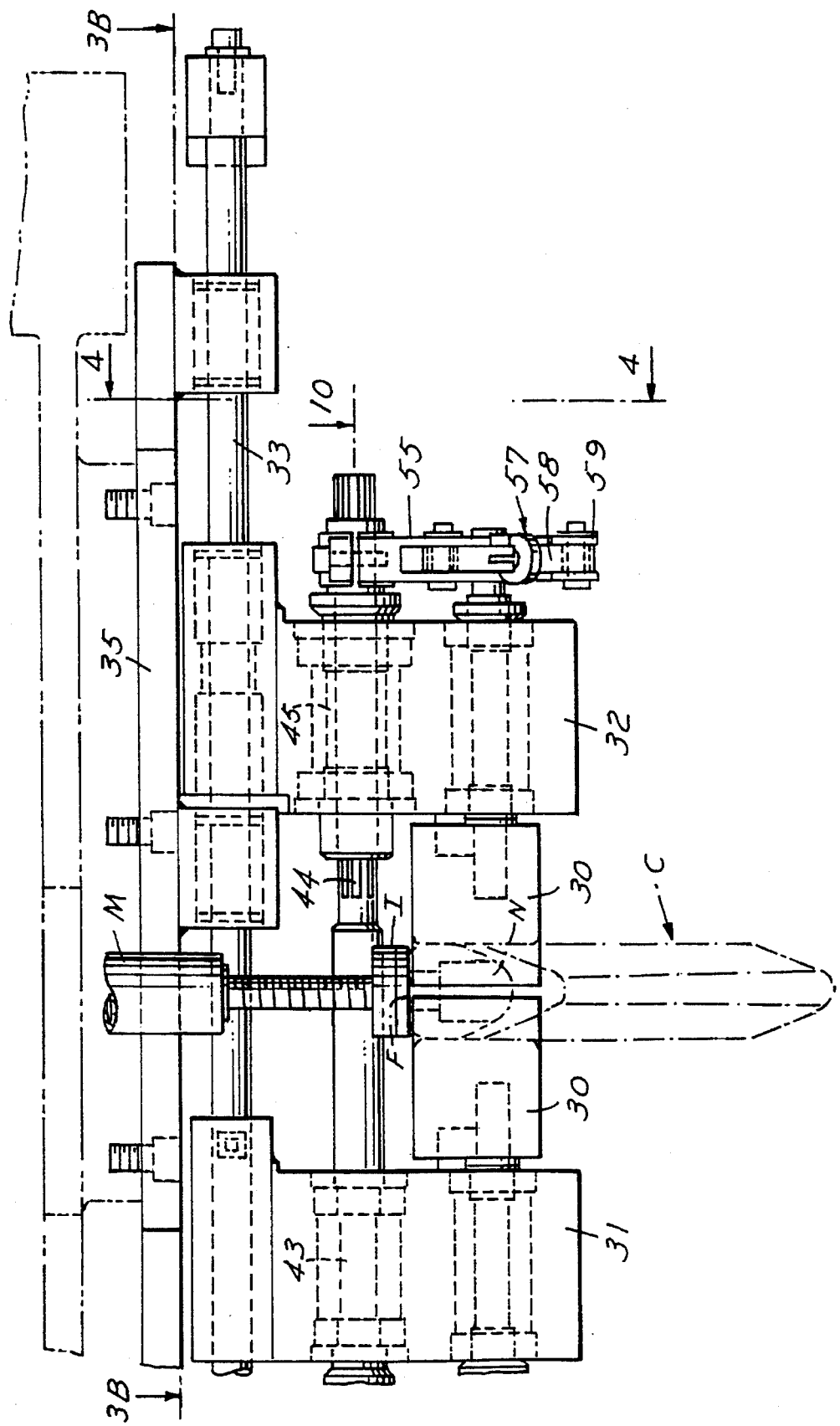

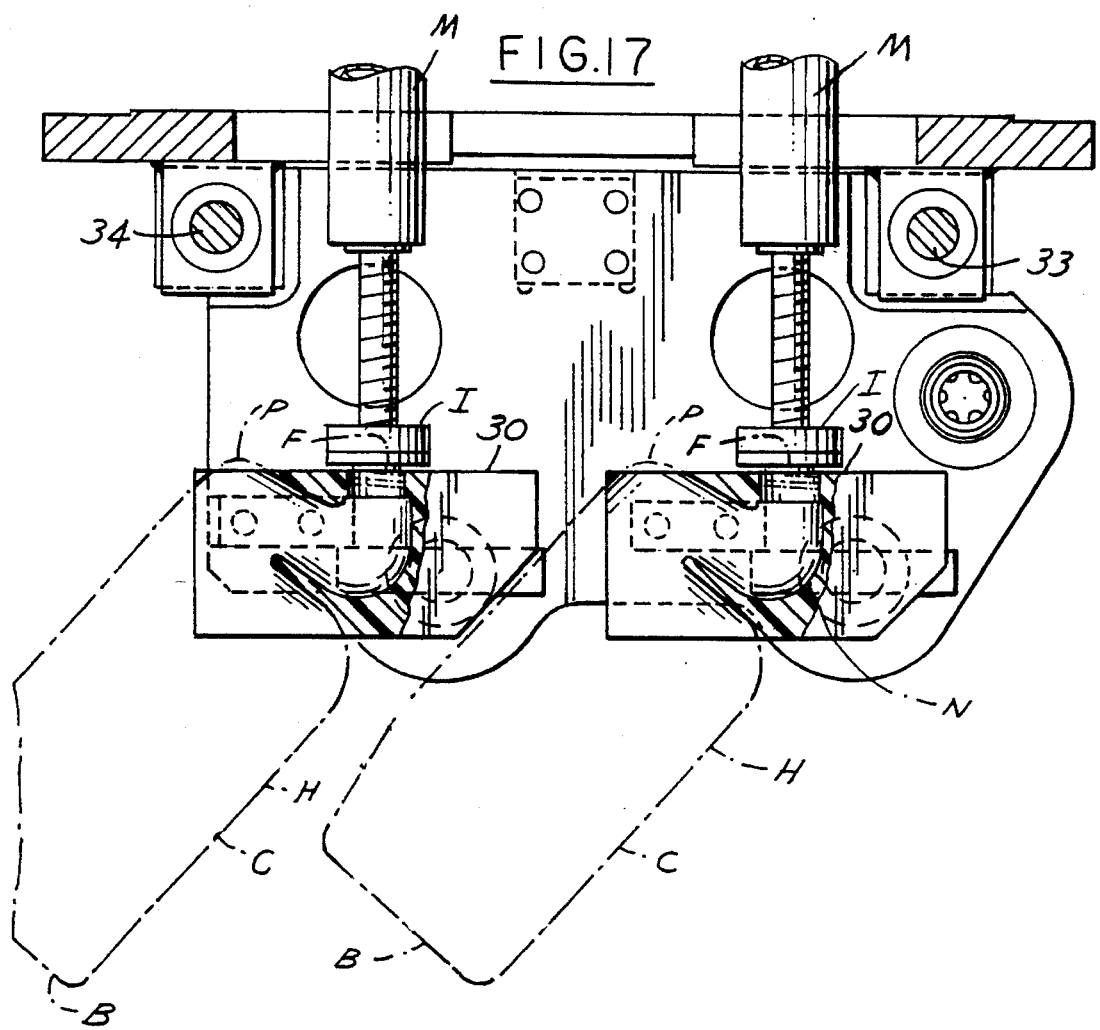

5,511,648

METHOD AND APPARATUS FOR TRIMMING AND INSPECTING PLASTIC CONTAINERS

This is a continuation of application Ser. No. 08/006,392 filed on Jan. 21, 1993 now abandoned.

This invention relates to the trimming of molded plastic articles and more particularly to the trimming and inspecting of the flash and finish of hollow blow molded plastic articles.

BACKGROUND AND SUMMARY OF THE INVENTION

When formed in molds by expanding an extruded parison, hollow blow molded plastic articles such as containers or bottles usually have flash in at least one of the shoulder, neck and finish areas. The finish also has material which must be removed to provide an end face for sealing engagement with a closure or cap engageable with the neck of the article.

Various methods and apparatus have been previously used to remove the flash from an article and machine a face on the finish. In these methods, a separate apparatus or machine has been used to perform each step of removing the flash, removing material from the finish, forming a face on the finish, and inspecting the completed article. Conveyors move the articles from one machine to the next and separate transfer mechanisms associated with each machine pickup and load articles into each machine and unload articles from each machine.

In U.S. Pat. No. 4,614,018 there is disclosed a method and apparatus wherein hollow plastic articles to be trimmed are intermittently advanced through a plurality of generally circumferentially spaced stations by a turret carrying vacuum heads engaging the articles. To assure positive accurate location of the articles in each station, each vacuum head picks up and engages an article in a load station and continuously engages the same article throughout all successive stations unless the article is rejected and released prior to the unload station. Preferably, to facilitate processing runs of articles of different sizes, the articles are located and engaged relative to a bottom edge thereof. Preferably, to facilitate loading, unloading and processing of articles in the stations, each vacuum head can be moved to change the orientation of the axis of the article it is carrying from one station to another. When at least two articles could be processed at the same time in a station, the articles are laterally spaced apart when carried by each vacuum head assembly to facilitate processing them in the station. To facilitate changing the cycle time of the trimming apparatus, the turret and the loading and processing equipment in the various stations are all driven by a common variable speed drive. To facilitate processing runs of articles of different sizes, the location of the processing equipment in each station can be varied and adjusted with respect to the position of articles in the station engaged by the vacuum heads.

It has been known that when a simple conveyor is used, significant effort is needed to insure that the bottles are accurately located in each station prior to beginning the operation. The process of locating the bottle causes time loss and uses significant floor space. In addition, the conveyor speed must be relatively slow to prevent tipping of the bottles. The slow speed of the conveyor further limits the speed of the trimming system.

When a more complex apparatus with bottle holding nests is used, the location and speed problems are reduced and less floor space is needed. However, this type of conveyor requires a large number of bottles holding nests which require more investment and time for each job change. Such a method and apparatus are shown, for example, in U.S. Pat. No. 4,198,886.

Most bottles are designed to stand on a stable flat base. Because of this it is possible to handle most bottles on a simple conveyor without special tooling. However, empty plastic bottles with flash at the top are difficult to convey standing up because they are very unstable.

In application Ser. No. 07/757,391, filed Sep. 10, 1991, OI Docket No. 16549, now U.S. Pat. No. 5,167,316 issued Dec. 1, 1992, there is disclosed a method and apparatus for positioning and indexing molded hollow plastic articles for trimming molded hollow plastic articles having flash and a finish for a closure, wherein the articles are supported and moved in succession by vacuum conveyor which holds the articles in upright position and moves them past successive stations for deflashing, facing, inspection, rejection and unloading. The conveyor is a chain slat conveyor having longitudinally spaced vertical holes that communicate with a vacuum chamber over which the conveyor is trained. The conveyor is driven intermittently and moves the articles in succession past each of the stations. At the load station, the articles are oriented so that they are in proper alignment and relationship to the opening in the conveyor.

In each of the methods and apparatus for trimming and inspecting heretofore used, when it is desired to trim or inspect a hollow plastic container which has a neck at an angle to the vertical axis of the container so that the opening of the container has its axis at an angle to the longitudinal axis of the container, it has been common to have the tooling at the various stations of the trimming and inspecting apparatus be positioned at an angle in order to perform the work operation at each of the stations. Such operations include facing the open end of the container, leak checking, measuring the height of the finish on the neck, and label inspection. Such a method and apparatus is cumbersome in that it requires critical adjustment and further it is not possible to perform such operations at high speed.

In U.S. Pat. No. 5,121,587, an apparatus is described for applying closures on containers having a mouth which is inclined to the axis of the containers. Each container is gripped by jaws which grip the body of the container to rotate the container about an axis through the body of the container. However such an apparatus would not be accurate enough to hold the finish of the container for performing trimming, such as reaming, or inspection. It has been found that such containers is subject to distortion due to shrinkage.

Accordingly, among the objectives of the present invention are to provide a method and apparatus for tilting the containers at each station wherein a trimming or inspecting operation is to be performed which will function to orient the neck accurately in a vertical position; which has controlled acceleration and deceleration promoting positive container handling; wherein a single motion causes clamping and rotating; and wherein the apparatus can be readily adjusted to accommodate containers wherein the opening in the container ranges in angle from zero to 45° so that the same apparatus can be adjusted to any angle of tilting or no tilting at all.

In accordance with the invention a method and apparatus for trimming and inspecting hollow plastic containers having a neck which has an opening that forms an angle with the vertical axis of the hollow container wherein as the hollow container is moved by a conveyor intermittently past a succession of stations of a trimming and inspection apparatus, the neck of the container is clamped and oriented so that the axis of the opening is vertical and the trimming or inspecting tooling is moved downwardly to engage and perform the trimming or inspecting. In a preferred form two containers are clamped and oriented.

Basically the apparatus comprises opposed clamping nests which clamp the neck of one or more containers as the container is moved intermittently to each station of the trimming and inspecting apparatus. The clamping nests are moved inwardly to clamp the neck of a container and are rotated to orient the neck of the container vertically. The movement of the clamping and rotating the nests is performed in a single continuous motion.

DESCRIPTION OF THE DRAWINGS

FIG. 1 is a side elevational view of a trimming and inspecting apparatus embodying the invention.

FIGS. 2A and 2B are fragmentary side elevational views of an apparatus embodying the invention.

FIG. 10 is a fragmentary sectional view taken along the line 10—10 in FIG. 2A.

FIG. 11 is a side elevational view of a cam utilized in the apparatus.

FIG. 11A is a view of the cam from the side opposite that shown in FIG. 11.

FIG. 14 is a view similar to FIG. 2B showing the facing tooling in operating position.

FIG. 15 is a view similar to FIG. 7 showing the facing tooling in operating position.

FIG. 16 is a view similar to FIG. 2B showing the inspecting tooling in operating position.

FIG. 17 is a view similar to FIG. 7 showing the inspecting tooling in operating position.

DESCRIPTION

Figure 3A:
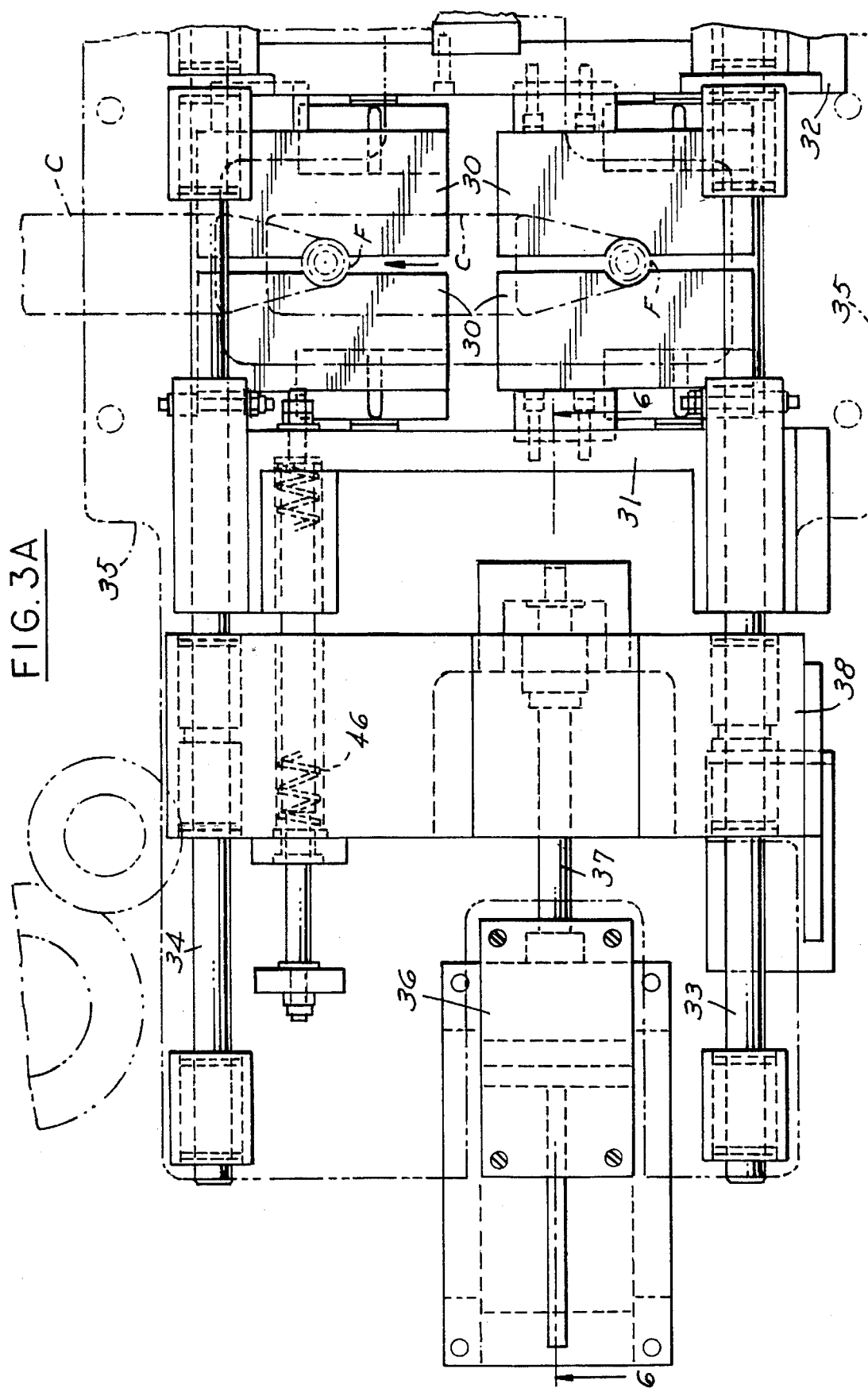
FIG. 3A is a fragmentary sectional view taken along the line 3A—3A in FIG. 2A.

In accordance with the invention, the method and apparatus for trimming molded hollow plastic containers, such as plastic bottles, having flash and a finish for a closure, comprises supporting the containers and moving them in succession by vacuum conveyor 10 which holds the articles in upward position and moves them past station for deflashing, facing, inspection, rejection and unloading. The conveyor 10 is a chain slat conveyor having longitudinally spaced vertical holes that communicate with a vacuum chamber over which the conveyor is trained. The conveyor is driven intermittently and moves the articles in succession past each of the stations. At a load station, the articles are oriented by a loading apparatus so that they are in proper alignment and relationship to the openings in the conveyor.

Referring to FIG. 1, the apparatus comprises a frame F that supports a conveyor frame 11 comprising a power driven roller 12 at one end and an idler roller 13 at the other over which the vacuum conveyor in the form of a link slat conveyor 10 is trained and driven intermittently in the direction of the arrow as shown in FIG. 1. The drive for the conveyor is from a motor 14 and linkage 15.

The conveyor 10 has longitudinally spaced openings therein which communicate through an opening of a vacuum chamber to apply vacuum that draws the base of the articles and holds the article onto the conveyor 10.

The containers comprise hollow blow molded plastic containers which are formed with flash and a neck that requires trimming for receiving a closure. Such articles are light in weight and unstable when empty.

The conveyor moves article received from a loader 20 at a first station preferably to successive stations as follows:

Station 1—Loading
Station 2—Orientor
Station 3—Position check
Station 4—Deflashing
Station 5—Idle
Station 6—Facer
Station 7—Idle
Station 8—Leak check and label inspection
Station 9—Rejection
Station 10—Idle
Station 11—Off-load At each of the deflash, facer and leak check and label inspection stations, apparatus well known in the art is provided to perform these functions. Such apparatus is driven in time relationship with the motion of the conveyor 10 from the motor 14 through linkage 21, 22 and 23.

The loading apparatus 20 includes a bottle stop which is extended and retracted by a cylinder to interrupt the movement of the bottle so that it can be engaged by a cup head and a loader nest operated by a cylinder for accurately positioning the container or bottle longitudinally of the conveyor 10 and mechanisms for providing a sequence as follows:

1. Loader nest "extends"
2. Vacuum cup head "extends"
3. Bottle stop "retracts"
4. Loader nest "retracts"
5. Loader vacuum cup head "indexes bottle"
6. Vacuum cup head "retracts"
7. Bottle stop "extends"
8. Loader vacuum cup head "indexes back"
9. Vacuum conveyor indexes 15" inches The operation of the loading apparatus is performed in timed relationship to the operation of the conveyor and the mechanisms which perform functions on the article, all of the drive being from a common drive.

The aforementioned apparatus is substantially as disclosed in the aforementioned application Ser. No. 07/757, 391, now U.S. Pat. No. 5,167,316, incorporated herein by reference, and differs only in the apparatus for clamping and rotating the containers at the stations wherein a trimming operation or an inspecting operation is to be formed requiring that the neck of the container be oriented so that the opening has its axis extending vertically in order that the trimming tooling or inspecting tooling can be associated with the opening.

In accordance with the invention, the hollow plastic containers having a neck which has an opening that forms an angle with the vertical axis of the hollow container are moved by the conveyor 10 intermittently past a successive of stations in the trimming and inspection apparatus, the neck of the container is clamped and oriented so that the axis of the opening is vertical and the trimming or inspecting tooling is moved downwardly to engage and perform the trimming or inspecting. In a preferred form two containers are clamped and rotated.

Figure 13:
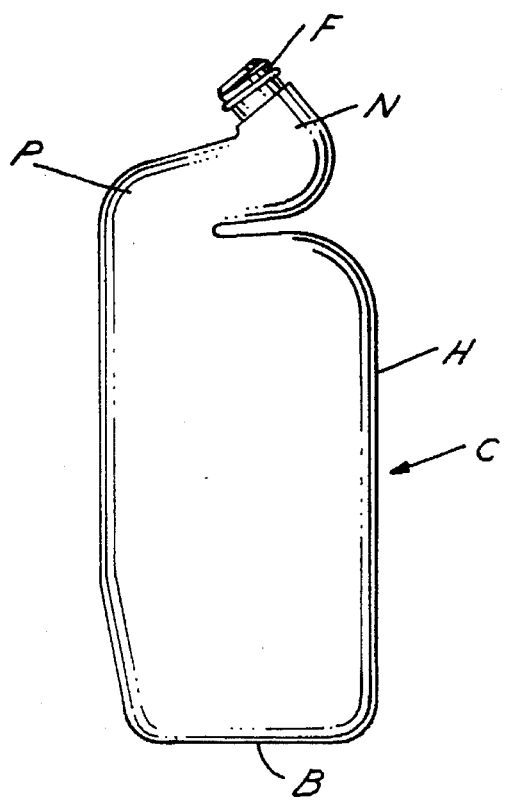
FIG. 13 is an elevational view of a container which is to be trimmed and inspected.

Referring to FIG. 13 which is an elevational view a typical container C which is to be trimmed and inspected consists of a hollow plastic body H and has a base B which will engage the vacuum conveyor for movement of the container successively through the trimming and inspecting stations. The container C includes a neck N which has an axis forming an angle to the vertical axis parallel to the axis of the container so that the free end, known as a finish F, defines an opening that has its axis at an angle to the vertical. In the container C shown, the neck N includes a further horizontal portion P that is generally parallel to the base B and is connected to a connecting portion that extends to one side of the main body H of the container.

Figure 3B:
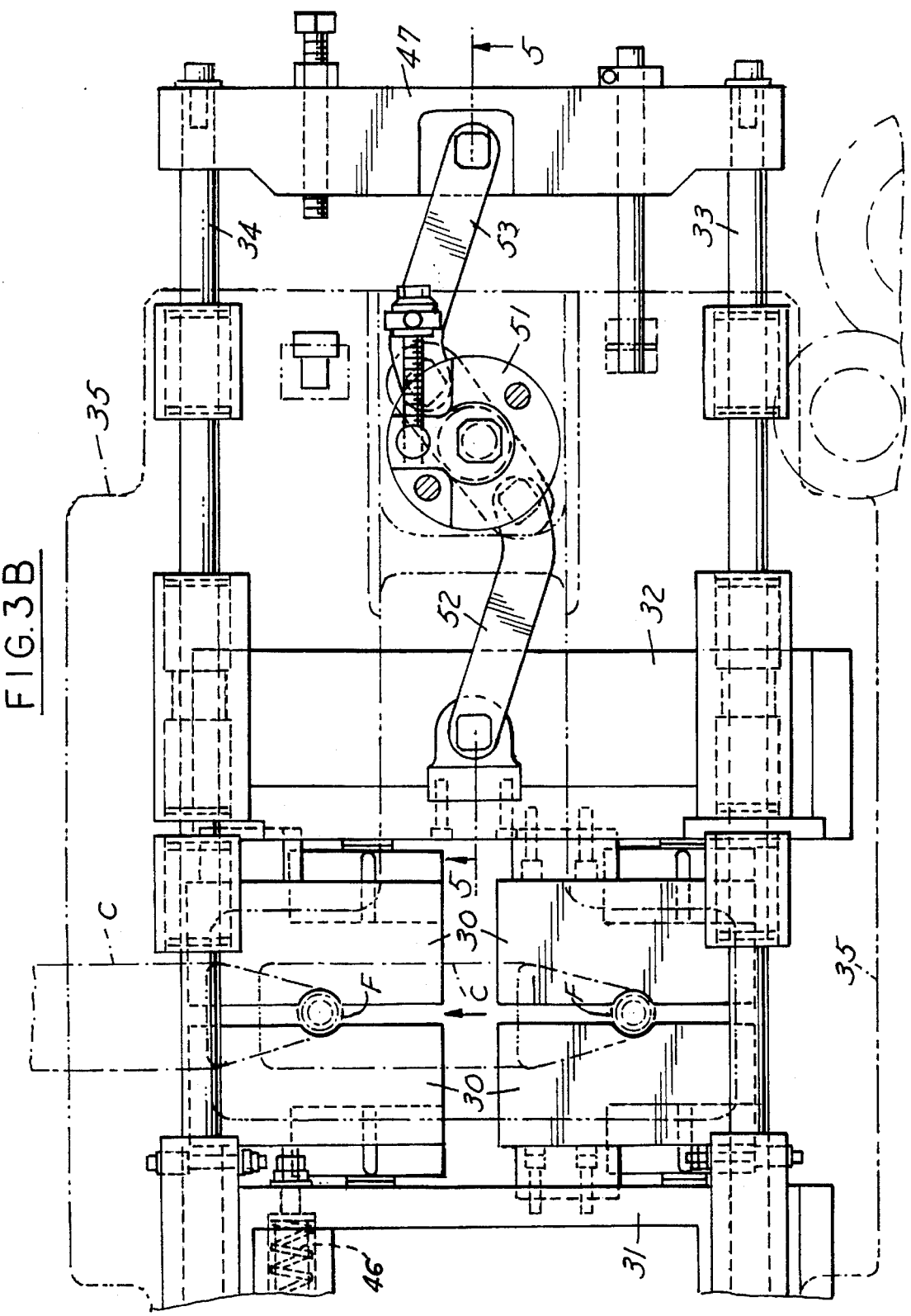
FIG. 3B is a fragmentary sectional view taken along the line 3B—3B in FIG. 2B.
Figure 8:
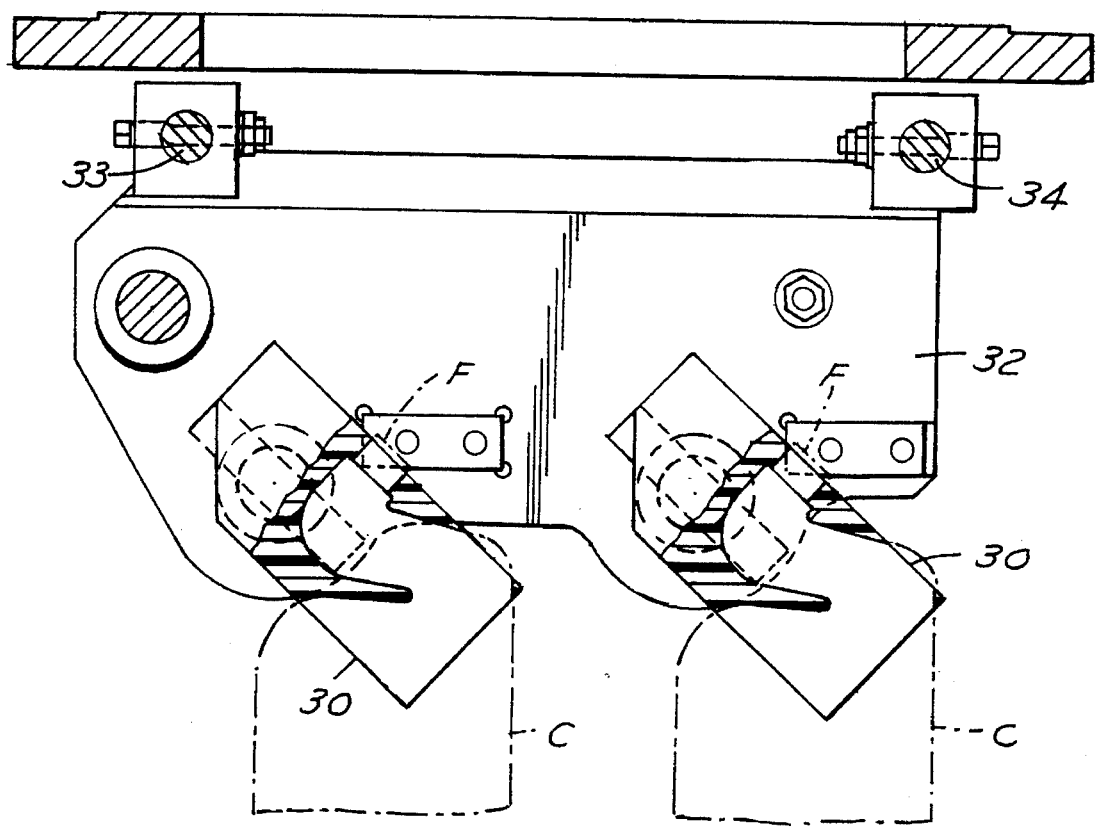
FIG. 8 is a fragmentary sectional view taken along the line 8—8 in FIG. 2A.

Referring to FIGS. 2A, 2B which are elevational views and FIGS. 3A and 3B which are plan views, the apparatus comprises clamping nests 30 that are adapted to engage the neck N of the container C and rotate the container to bring the axis of the opening into a vertical position. In the apparatus shown a pair of containers C are to be rotated simultaneously at the station (FIG. 8). The clamping nests 30 are mounted for movement toward and away from one another and for rotation about a horizontal axis so that the necks of the containers C are clamped and rotated or tilted to the desired position and thereafter returned on the return stroke to their position so that the axis of the container will be vertical and the base of the container will once again engage the vacuum conveyor 10 for movement to the next station.

The clamping nests 30 are mounted for rotation on carrier blocks 31, 32 which are in turn clamped for movement on rods 33, 34 journalled for sliding movement on a frame 35.

Figure 6:
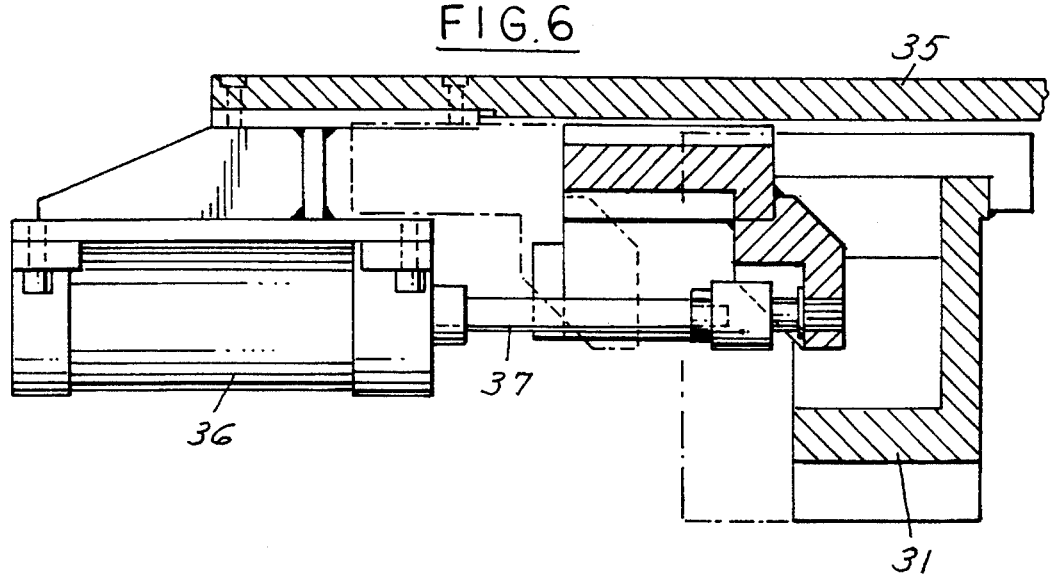
FIG. 6 is a fragmentary sectional view taken along the line 6—6 in FIG. 2B.

A fluid linear motor 36 is mounted on the frame 35 (FIG. 6) and has a shaft 37 connected to the block 31 to move the carrier block 31 toward and away from clamping position with respect to containers C. The frame 35 also supports a cam housing 38 in which a cylindrical cam 39 is fixed on housing 38. A cylindrical cam 39 has a slot 40 which is engaged by a cam follower 41 on a shaft 42 that in turn is connected by a connector 42a to a shaft 43 rotatably mounted in block 31 (FIGS. 10 and 11). Shaft 43 in turn is connected by splines 44 thereon to a sleeve 45 mounted in block 32. A spring 46 is interposed between the frame 35 and carrier block 31 to provide a lost motion.

Figure 5:
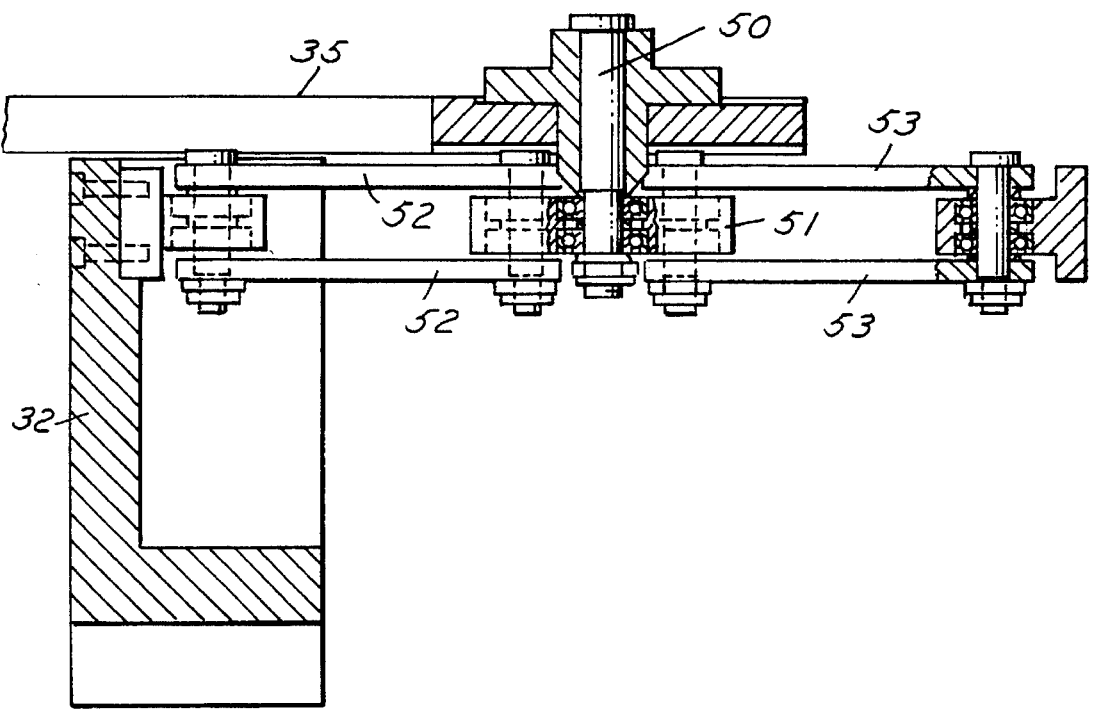
FIG. 5 is a fragmentary sectional view taken along the line 5—5 in FIG. 3B.

A tie strap 47 is provided between the rods 33, 34 at one end which in turn is reciprocated by movement of the motor 36. A linkage interconnects the block 32 with the tie strap 47 such that the block 32 is moved simultaneously toward and away from the containers C to cooperate with the nests on the block 31 and clamp the containers. Referring to FIGS. 3B and 5, this linkage includes a pivot pin 50 on frame 35 that rotatably supports a rotatable member 51 which, in turn, is pivotally connected to interconnecting links 52 between the block 32 and the rotatable member 51 and links 53 between the rotatable member and the tie strap 47. When the tie strap is moved to the right in FIG. 3B, the block 32 positions the clamping nests thereon into clamping position and when the tie strap 47 is moved to the left in FIG. 3B, the block 32 is retracted out of clamping position.

Figure 4:
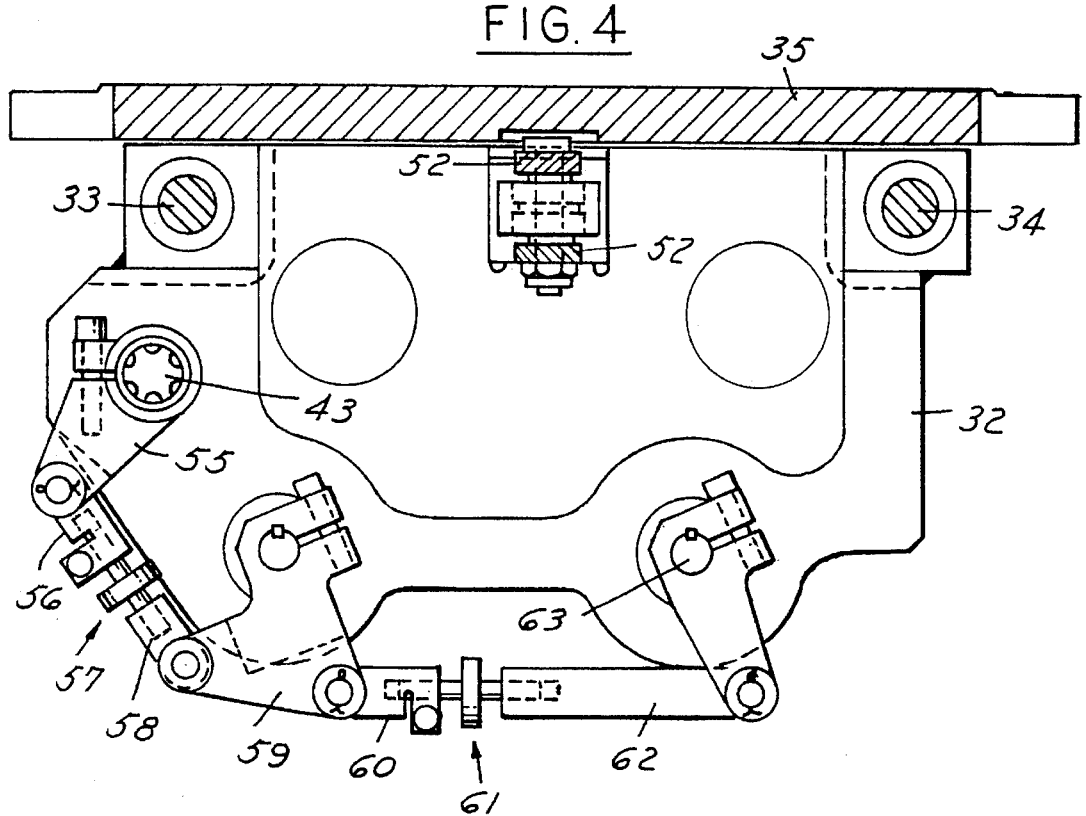
FIG. 4 is a fragmentary sectional view taken along the line 4—4 in FIG. 2B.
Figure 9:
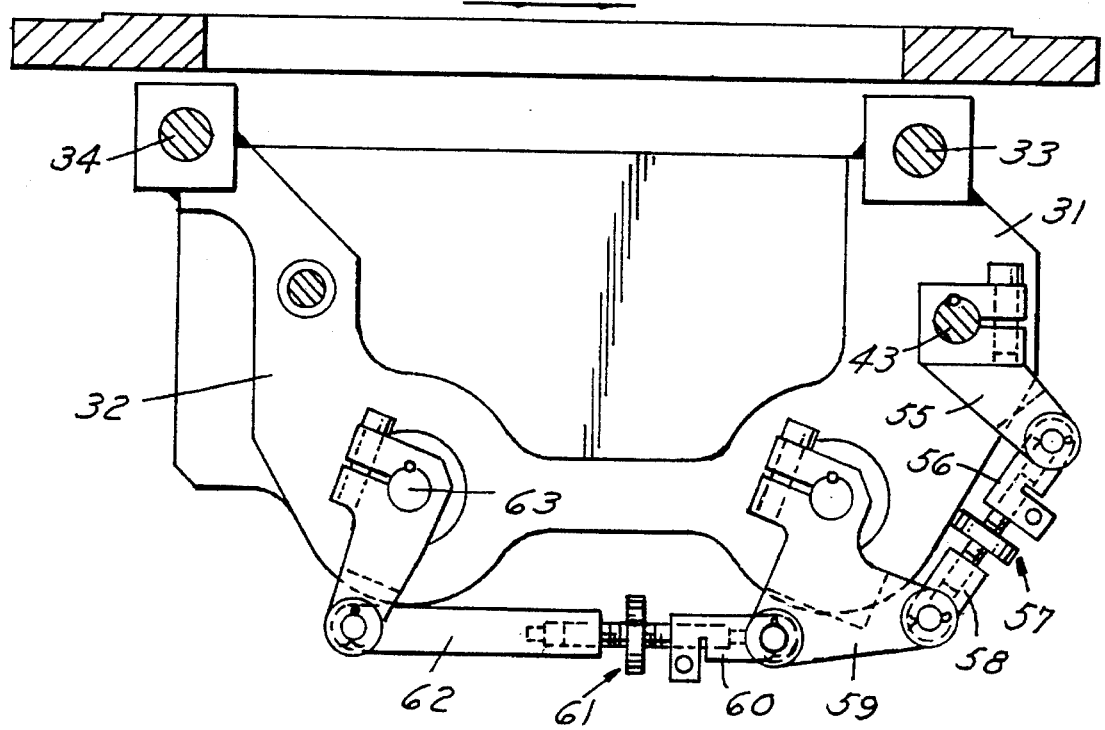
FIG. 9 is a fragmentary sectional view taken along the line 9—9 in FIG. 2A.
Figure 12:
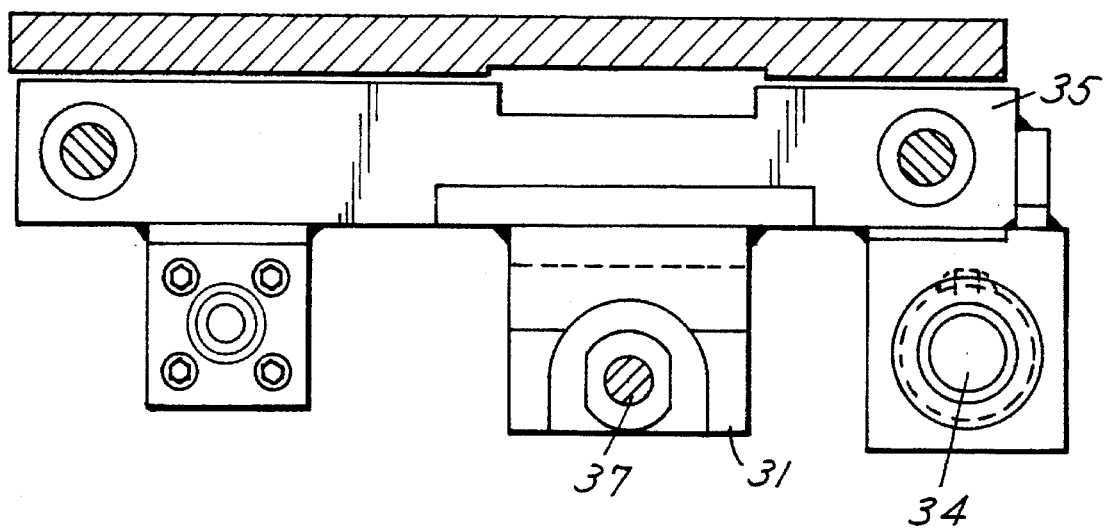
FIG. 12 is a sectional view taken along the line 12—12 in FIG. 2A.

Referring to FIGS. 4 and 9, the rotation of the spline shaft 43 is transmitted to the nests of each pair of nests on each block 31 and block 32 by linkages which are substantially identical but mirror images of one another. Referring to FIG. 4, the linkage for rotating the nests 30 on block 31 includes a reaction lever 55 that is keyed to the spline shaft 43 and a linkage that includes a driven link 56 pivoted to the reaction lever 55, a turn buckle 57 extending to a link 58 pivoted to an intermediate lever 59 for rotating one of the clamping nests 30 and a driven link 60 pivoted to the intermediate lever 59 and connected through a turn buckle 61 to a link 62 pivoted to an actuator lever 63 that is keyed to the shaft 63 of the other nest 30. The turn buckles 58, 62 provide for precise orientation of the neck in vertical position in order that the facing or inspection may occur efficiently.

Referring to FIG. 11A, the cam 39 is reversible and has a second track 40a which functions to permit the container to remain in a vertical position such that the apparatus can be used in an orienting mode or a non-orienting mode.

Figure 7:
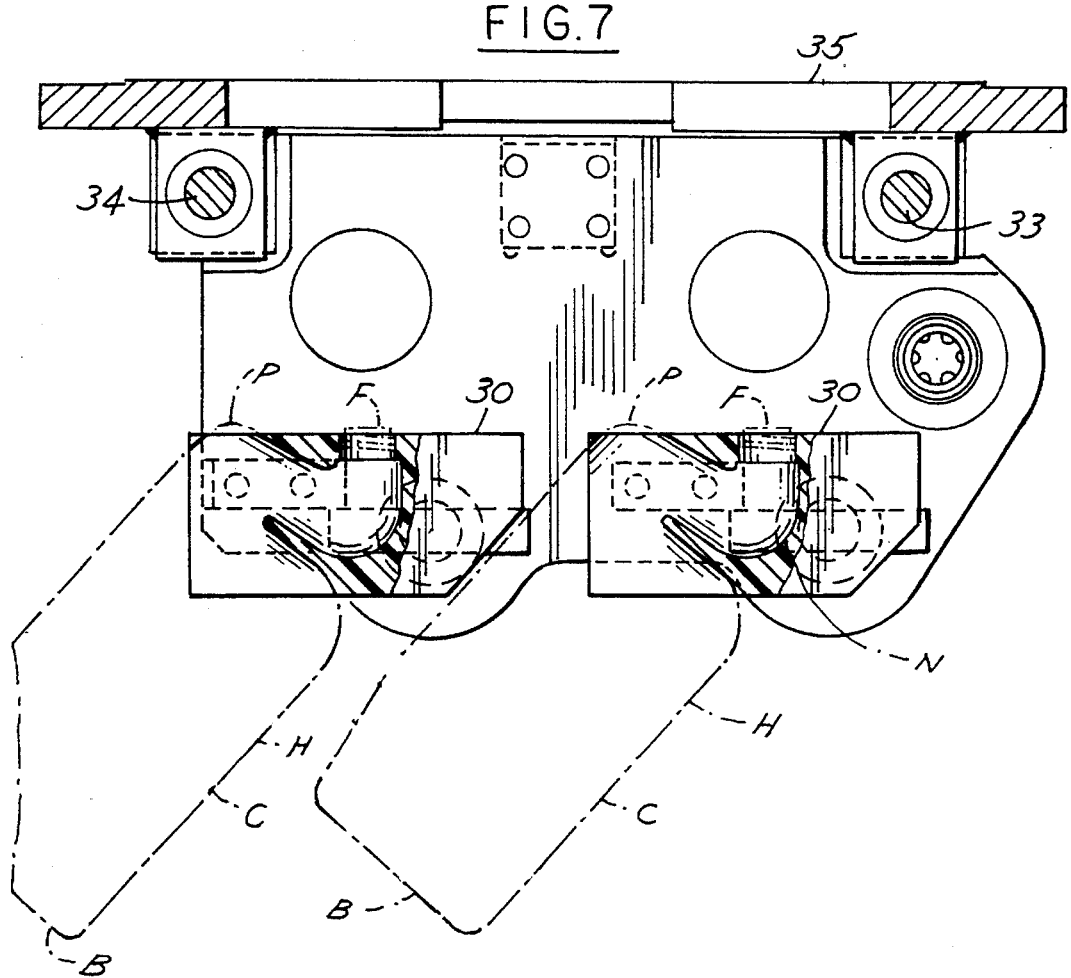
FIG. 7 is a fragmentary sectional view taken along the line 7—7 in FIG. 2A.

FIGS. 14 and 15 are views similar to FIGS. 2B and 7, respectively, showing the facing tooling in position. Each facing tool T is moved toward and away from a container C by a fluid cylinder M. Similarly, FIGS. 16 and 17 are views similar to FIGS. 2B and 7, respectively, showing the inspection tooling in position. Each inspection tool I is moved toward and away from a container C by a fluid cylinder M.

It can thus be seen that there has been provided a method and apparatus for tilting the containers at each station wherein a trimming or inspecting operation is to be performed which will function to orient the neck accurately in a vertical position; which has controlled acceleration and deceleration promoting positive container handling; wherein a single motion causes clamping and rotating; and wherein the apparatus can be readily adjusted to accommodate containers wherein the opening in the container ranges in angle from zero to 45° so that the same apparatus can be adjusted to any angle of tilting or no tilting at all.

We claim:

1. A method for orienting hollow plastic containers wherein each container has a longitudinal axis and a neck and finish which has an opening which has an axis that forms an angle with the longitudinal axis of the hollow plastic container for performing trimming functions and inspecting functions on the hollow plastic containers, said method comprising depositing each container on a horizontal conveyor such that the longitudinal axis of the container is vertical with respect to the conveyor, and moving each container intermittently past a succession of stations of a trimming and inspection apparatus by moving said conveyor, providing tooling at at least one station, at at least one of said stations, clamping solely the neck of each container, thereafter rotating each clamped container about a horizontal axis such that each container is moved out of engagement with the conveyor to a position such that the axis of the opening in the finish is vertical, thereafter performing a function on each container by moving the tooling downwardly into engagement with the finish to perform the function while maintaining the neck of each container clamped in the aforesaid position, thereafter rotating each clamped container to its original position, and releasing each container onto the conveyor.

2. The method set forth in claim 1 wherein said step of clamping comprises providing opposed nests having recesses for engaging solely the neck of the container and the step of moving the nests into clamping engagement.

3. The method set forth in claim 2 wherein the step of rotating each clamped container about a horizontal axis comprises rotating said nests about said horizontal axis such that the axis of the opening in the finish is vertical.

4. The method set forth in claim 3 wherein the step of clamping comprises simultaneously clamping the necks of two containers.

5. An apparatus for orienting hollow plastic containers wherein each container has a neck which has an opening that has an axis that forms an angle with the longitudinal axis of the hollow plastic container for performing trimming functions and inspecting functions wherein the apparatus includes a succession of stations, each station including tooling that is movable for performing a function, said apparatus comprising a horizontal vacuum conveyor for supporting and moving hollow plastic containers in upright position with the longitudinal axis vertical, means for intermittently moving the conveyor to move a container past said succession of stations of the apparatus, clamping and orienting means at at least one of said stations for clamping solely the neck of each container at each station and thereafter rotating each container while clamped about a horizontal axis such that the axis of the opening is vertical with respect to the conveyor and said tooling can be moved downwardly to engage and perform a function on the container at said station, said means for clamping and rotating each container being operable to return and release each container onto said conveyor.

6. The apparatus set forth in claim 5 wherein said means for clamping the neck of each container comprises opposed nests for engaging solely the neck of the container and means for moving said nests toward and away from neck clamping position.

7. The apparatus set forth in claim 6 wherein said means for clamping and orienting a container comprises a cam and cam follower mechanism wherein said cam follower is connected to said nests, said cam having a first track which functions to orient said container when the cam follower is in engagement with said first track and a second track which functions to permit the container to remain in a vertical position when the cam follower is in engagement said second track such that the apparatus functions in one of a neck orienting mode and a neck non-orienting mode.

8. The apparatus set forth in claim 7 including a frame, opposed carrier blocks, means for supporting said nests for rotation on said carrier blocks, and means for supporting said carrier blocks for sliding movement on said frame toward and away from one another.

9. The apparatus set forth in claim 8 wherein said linkage means is adjustable.

10. The apparatus set forth in claim 9 wherein a second set of nests are mounted for rotation on each said carrier block for clamping solely the neck of a second container and second linkage means interconnecting said first linkage means rotatably supporting said first set of nests and said second set of nests such that the nests are rotated simultaneously.

11. The apparatus set forth in claim 10 wherein said second interconnecting linkage means are adjustable for precise orientation.

\* \* \* \* \*